A. O. SLENTZ, DEC'D.
W. E. SLENTZ, ADMINISTRATOR.
CLUTCH.
APPLICATION FILED AUG. 25, 1914.
1,153,831. Patented Sept. 14, 1915.
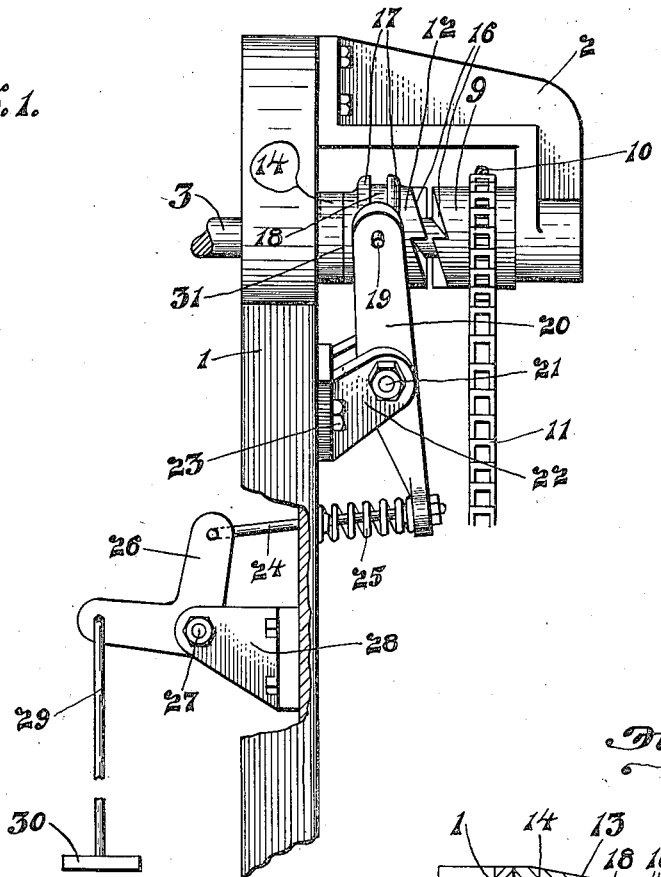
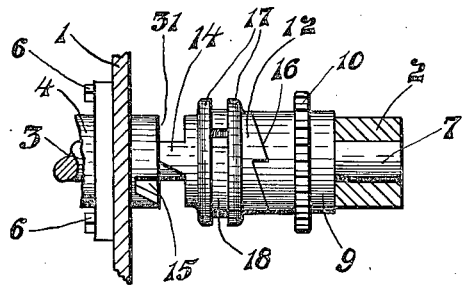
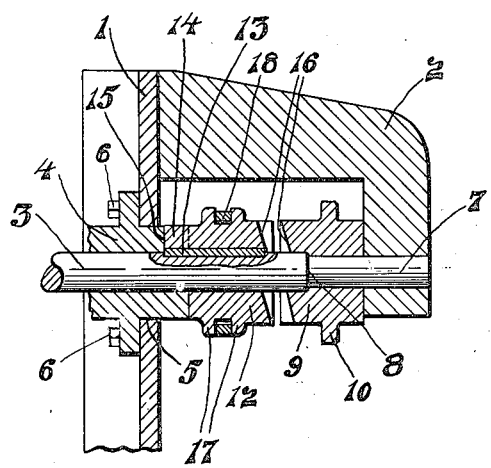
Witnesses
Robert Karcher
J. H. Bishop
Inventor
Albertus O. Slentz
By F. W. Bond
Attorneys

UNITED STATES PATENT OFFICE.

ALBERTUS O. SLENTZ, OF CANTON, OHIO; WARREN E. SLENTZ ADMINISTRATOR OF SAID ALBERTUS O. SLENTZ, DECEASED.

CLUTCH.

1,153,831.  Specification of Letters Patent.  Patented Sept. 14, 1915.

Application filed August 25, 1914.  Serial No. 858,478.

*To all whom it may concern:*

Be it known that I, ALBERTUS O. SLENTZ, a citizen of the United States, residing at Canton, in the county of Stark and State of Ohio, have invented a new and useful Clutch, of which the following is a specification.

My invention relates to improvements in clutches and has more especial reference to that particular class of clutches in which the members of the clutch are operated and held in operative engagement during one complete revolution of the clutch, by positive means, the members being automatically thrown out of engagement at the end of the revolution.

The object of this invention is to provide a clutch of the character referred to in which the sliding clutch member when thrown into engagement with the loose clutch member, is held in engagement by positive means during one complete revolution of the clutch, the sliding clutch member being automatically thrown out of engagement at the end of the revolution.

With these objects in view the invention consists in the novel construction and arrangement of parts, hereinafter described, illustrated in the accompanying drawings, and particularly pointed out in the appended claims, it being understood that various changes in the form, proportions, size and minor details of construction may be made without departing from the spirit or sacrificing any of the advantages of the invention.

In the accompanying drawing: Figure 1 is a side elevation of the clutch constructed in accordance with my invention, showing means for operating the same. Fig. 2 is a longitudinal sectional view of the same, showing the clutch members disengaged. Fig. 3 is a detail plan view of the same showing the clutch members engaged.

Similar numerals of reference indicate corresponding parts throughout the several figures of the drawing.

A portion of the frame of the machine is indicated by the numeral 1 and a bracket 2 connected thereto and adapted to support one end of the shaft 3 upon which the clutch is mounted, the shaft also having a bearing in the boss 4 the outer extremity of which projects through an aperture 5 in the frame, said boss being connected to the frame by means of bolts 6 or their equivalents. The outer end of the shaft 3 is reduced at 7 providing a shoulder 8 which is adapted to prevent the loose member 9 of the clutch from moving laterally upon the shaft, a sprocket 10 is provided upon the loose clutch member 9 and a sprocket chain 11 is located over said sprocket and connected to any suitable source of power, the loose clutch member 9 being continuously rotated upon the shaft 7.

The sliding clutch member 12 is loosely mounted upon the shaft 3 and is held against rotary movement with relation to said shaft by means of the feather 13, said feather allowing only lateral movement, upon the shaft of the clutch member 12. The member 12 is provided upon its inner face with a lug 14 which is adapted to be located within the notch 15 in the boss when the clutch members are not engaged, as shown more clearly in Fig. 2. The clutch members 9 and 12 are preferably provided with the teeth 16 upon their adjoining faces, although any suitable form of clutch faces may be used if desired.

Although any suitable means may be used for throwing the sliding clutch member into engagement with the loose member I prefer to use the mechanism illustrated in the drawings. Preferably a pair of spaced annular flanges 17 are provided, allowing the periphery of the sliding clutch member and a split ring 18 provided with a stud 19 is loosely mounted upon said clutch member between the annular flanges. A lever 20 pivoted at 21 to a bracket 22 which is attached to the frame 1 by any suitable means, preferably by bolts 23, is pivotally connected to the stud 19 at its upper extremity, a link 24 being attached to the lower extremity of the lever, said link passing through the frame 1 and having a compression spring 25 located thereon and interposed between the frame and the lower end of the lever 20. The opposite extremity of the link 24 is pivotally attached to a bell crank 26 which is pivoted at 27 to a bracket 28 carried by the frame. A downwardly depending link 29 connects the bell crank to a suitable treadle 30.

The operation of the clutch is as follows: When the treadle 30 is depressed the system of links and levers will move the sliding clutch member 12 laterally upon the shaft 3 bringing the teeth 16 thereon into engagement with the teeth of the loose clutch member 9. As the loose member 9 is being continuously rotated, as above described, this rotary movement will be communicated to the sliding member 12 as soon as the two members are coupled together. As the sliding clutch member is moved into engagement with the loose member the lug 14 upon the sliding member will be drawn out of contact with the notch 15 and as the sliding member 12 starts to rotate the lug 14 will be caused to ride upon the face 31 of the boss 4 thus holding the sliding member 12 in positive engagement with the loose member 9. When a complete revolution has been made by the clutch the spring 25 acting upon the lever 20 will cause the sliding member to be thrown out of engagement with the loose member of the clutch, the lug 14 upon said sliding member being reseated in the notch 15 thus bringing to a stop the rotation of the sliding member 12 together with the shaft 3 upon which it is mounted.

Although the drawings and above specification disclose the best mode in which I have contemplated embodying my invention I desire to be not limited to the details of such disclosure, for, in the further practical application of my invention, many changes in form and construction may be made, as circumstances require or experience suggests, without departing from the spirit of the invention, within the scope of the appended claims.

I claim:

1. The combination of a supporting frame, a boss mounted upon said frame, and provided with a notch in its outer face, a supporting bracket carried by said frame, a shaft having bearings in said bracket and in said boss, a loose clutch member rotatably mounted upon said shaft, means for continuously rotating said clutch member, a fixed clutch member slidably mounted upon said shaft, a lug upon said fixed clutch member adapted to normally rest within the notch in said boss, means for moving said fixed clutch member into engagement with said loose clutch member, said lug adapted to ride upon the outer face of said boss holding said clutch members in engagement during a complete revolution of said shaft and means for moving said fixed clutch member out of engagement with said loose clutch member when said lug again registers with the notch in said boss.

2. The combination of a supporting frame, a boss mounted upon said frame, and provided with a notch in its outer face, a supporting bracket carried by said frame, a shaft having bearings in said bracket and in said boss, a loose clutch member rotatably mounted upon said shaft, means for continuously rotating said clutch member, a fixed clutch member slidably mounted upon said shaft, a lug upon said fixed clutch member adapted to normally rest within the notch in said boss, a lever mounted upon said supporting frame, the upper extremity of said lever pivotally connected to said fixed clutch member, a spring adapted to normally hold said fixed clutch member out of engagement with said loose clutch member and means for operating said lever to bring said fixed clutch member into engagement with said loose clutch member.

In testimony that I claim the above, I have hereunto subscribed my name in the presence of two witnesses.

ALBERTUS O. SLENTZ.

Witnesses:
  JOHN H. BISHOP,
  F. W. BOND.